(12) United States Patent
Yoshida et al.

(10) Patent No.: US 12,191,521 B2
(45) Date of Patent: Jan. 7, 2025

(54) SEPARATOR FOR INSULATING ADJACENT BATTERY CELLS, AND POWER SOURCE DEVICE PROVIDED WITH SAME

(71) Applicant: SANYO Electric Co., Ltd., Osaka (JP)

(72) Inventors: Naotake Yoshida, Hyogo (JP); Nao Takeda, Hyogo (JP); Kazuhiro Harazuka, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 338 days.

(21) Appl. No.: 17/414,749

(22) PCT Filed: Sep. 27, 2019

(86) PCT No.: PCT/JP2019/038296
§ 371 (c)(1),
(2) Date: Jun. 16, 2021

(87) PCT Pub. No.: WO2020/137062
PCT Pub. Date: Jul. 2, 2020

(65) Prior Publication Data
US 2022/0077542 A1 Mar. 10, 2022

(30) Foreign Application Priority Data
Dec. 27, 2018 (JP) .................. 2018-244432

(51) Int. Cl.
*H01M 50/44* (2021.01)
*H01M 10/647* (2014.01)
(Continued)

(52) U.S. Cl.
CPC ......... *H01M 50/44* (2021.01); *H01M 10/647* (2015.04); *H01M 10/658* (2015.04);
(Continued)

(58) Field of Classification Search
CPC .... H01M 50/54; H01M 50/51; H01M 50/512; H01M 50/44; H01M 10/647;
(Continued)

(56) References Cited

U.S. PATENT DOCUMENTS

| 5,225,484 A | * | 7/1993 | Shiobara | ............ C08G 59/1444 525/476 |
| 8,071,234 B2 | * | 12/2011 | Okada | ..................... B60L 58/26 429/120 |
| 9,048,483 B2 | * | 6/2015 | Nakamura | .......... H01M 10/625 |
| 9,878,405 B2 | | 1/2018 | Kim et al. | |

(Continued)

FOREIGN PATENT DOCUMENTS

| CN | 105008786 A | 10/2015 |
| CN | 106058089 A | 10/2016 |

(Continued)

OTHER PUBLICATIONS

Kovacs, Z., Csik, A., & Lakatos, A. Thermal Science and Engineering Progress, 42, 101906, 2023 (Year: 2023).*

(Continued)

*Primary Examiner* — Milton I Cano
*Assistant Examiner* — Albert Michael Hilton
(74) *Attorney, Agent, or Firm* — WHDA, LLP

(57) ABSTRACT

To achieve both formability and heat insulating properties, separator according to an aspect of the present invention insulates adjacent battery cells. Separator includes heat insulation sheet including a fiber material and a heat insulation material including higher heat insulating properties than the fiber material, and formed member including higher shape stability than the heat insulation sheet. This enables shape of heat insulation sheet including high flexibility to be maintained using formed member formed into a predetermined shape.

11 Claims, 4 Drawing Sheets

(51) Int. Cl.
  *H01M 10/658* (2014.01)
  *H01M 50/209* (2021.01)
  *H01M 50/249* (2021.01)
  *H01M 50/291* (2021.01)
  *H01M 50/293* (2021.01)
  *H01M 50/414* (2021.01)

(52) U.S. Cl.
  CPC ....... *H01M 50/209* (2021.01); *H01M 50/249* (2021.01); *H01M 50/291* (2021.01); *H01M 50/293* (2021.01); *H01M 50/414* (2021.01)

(58) Field of Classification Search
  CPC ............. H01M 10/658; H01M 50/249; H01M 50/209; H01M 50/414; H01M 50/293; H01M 50/291
  See application file for complete search history.

(56) References Cited

U.S. PATENT DOCUMENTS

| | | | |
|---|---|---|---|
| 10,347,881 B2* | 7/2019 | Han | H01M 50/209 |
| 2015/0060026 A1* | 3/2015 | Kim | C04B 20/1074 |
| | | | 29/890.03 |
| 2016/0003404 A1 | 1/2016 | Shibata et al. | |
| 2016/0276721 A1* | 9/2016 | Ho | H01M 10/625 |
| 2016/0308186 A1 | 10/2016 | Han | |
| 2019/0140237 A1 | 5/2019 | Kaye et al. | |
| 2020/0058912 A1 | 2/2020 | Kuramitsu et al. | |
| 2020/0287256 A1 | 9/2020 | Honda et al. | |

FOREIGN PATENT DOCUMENTS

| | | | |
|---|---|---|---|
| CN | 108475748 A | | 8/2018 |
| CN | 109004245 A | | 12/2018 |
| CN | 111386628 A | | 7/2020 |
| EP | 488374 A2 | | 6/1992 |
| JP | 2006-048996 | | 2/2006 |
| JP | 2009-301877 A | | 12/2009 |
| JP | 2011-023296 A | | 2/2011 |
| JP | 2012-124319 A | | 6/2012 |
| JP | 2012-199045 A | | 10/2012 |
| JP | 2017-050164 A | | 3/2017 |
| JP | 2019-508632 A | | 3/2019 |
| JP | 2019-102244 A | | 6/2019 |
| KR | 102308635 | * | 10/2013 |
| WO | 2014/132652 A1 | | 9/2014 |
| WO | 2017/106524 A1 | | 6/2017 |
| WO | 2018/061894 A1 | | 4/2018 |
| WO | 2019/107561 A1 | | 6/2019 |

OTHER PUBLICATIONS

Machine translation of KR102308635 (Year: 2023).*
International Search Report of PCT application No. PCT/JP2019/038296 dated Oct. 29, 2019.
English Translation of Chinese Search Report dated Feb. 22, 2024 for the related Chinese Patent Application No. 201980086048.X. (3 pages).

* cited by examiner

SEPARATOR FOR INSULATING ADJACENT BATTERY CELLS, AND POWER SOURCE DEVICE PROVIDED WITH SAME

CROSS-REFERENCE TO RELATED APPLICATIONS

This application is a U.S. national stage application of the PCT International Application No. PCT/JP2019/038296 filed on Sep. 27, 2019, which claims the benefit of foreign priority of Japanese patent application No. 2018-244432 filed on Dec. 27, 2018, the contents all of which are incorporated herein by reference.

TECHNICAL FIELD

The present invention relates to a separator for insulating adjacent battery cells, and a power source device including a plurality of battery cells and a plurality of separators.

BACKGROUND ART

In recent years, electric vehicles using a power source device for propulsion have become widespread. Various configurations are known as electric vehicles, and examples thereof include a battery electric vehicle (BEV) equipped with a driving motor, a hybrid electric vehicle (HEV) equipped with an engine in addition to a motor, and the like. Power source devices mounted on these electric vehicles use a plurality of battery cells. Each battery cell is a secondary battery capable of charging and discharging, such as a lithium ion battery or a nickel hydrogen battery.

Battery cells have characteristics of significantly deteriorating at a high temperature, so that it is important to cool the battery cells to suppress deterioration of batteries. As a power source device including a cooling mechanism for cooling battery cells, a technique for forming a cooling flow path using a separator disposed between adjacent battery cells is known (PTL 1). The separator disclosed in PTL 1 is typically formed of a resin.

CITATION LIST

Patent Literature

PTL 1: Unexamined Japanese Patent Publication No. 2006-48996

SUMMARY OF THE INVENTION

The battery cell is known to cause various defects at a high temperature. In particular, when chemical reaction of an internal power generation element is promoted by heat, the internal power generation element may be further self-heated by heat generated by the chemical reaction. In recent years, a high-capacity battery cell has been desired as one of means for increasing a traveling distance of an electric vehicle. Increase in capacity of the battery cell increases a calorific value when the battery cell becomes abnormal. The power source device of PTL 1 has a configuration in which a cooling flow path is formed using a separator disposed between adjacent battery cells, so that the separator is required to be formed of a material having high formability. Typically, a resin is known as a material having high formability constituting the separator.

Unfortunately, as the capacity of the battery cell is further increased, the separator formed of a resin is increased in thickness to secure heat insulation performance, and thus energy density of the power source device may be lowered. Other examples of a material exhibiting high heat insulation performance include a heat insulation sheet including porous particles and a fiber sheet carrying the porous particles. However, the heat insulation sheet has a problem in that the porous particles are difficult to be formed into a shape other than a sheet.

The present invention is made to solve such a problem, and a main object of the present invention is to provide a separator having a configuration capable of achieving both heat insulation performance and formability. A power source device including such a separator achieves an effect of enabling reducing heat transfer between adjacent battery cells while reducing increase in size.

A separator according to an aspect of the present invention insulates adjacent battery cells. The separator includes a heat insulation sheet including a fiber material and a heat insulation material having higher heat insulating properties than the fiber material, and a formed member having higher shape stability than the heat insulation sheet.

A separator according to another aspect of the present invention insulates adjacent battery cells, and is a heat insulation sheet including a fiber material, a heat insulation material having higher heat insulating properties than the fiber material, and a thermoplastic resin having a property of being cured by application of heat.

A separator according to yet another aspect of the present invention insulates adjacent battery cells, and is a heat insulation sheet including a fiber material and a heat insulation material having higher heat insulating properties than the fiber material. The heat insulation sheet is wound and extends in one direction, and has a rod-like shape in which a cavity is formed about the center of the rod-like shape.

A power source device according to an aspect of the present invention includes: a plurality of battery cells each having a quadrangular outer shape; a plurality of separators for insulating adjacent battery cells; and a restraining member that collects the plurality of battery cells and the plurality of separators. Each separator is the separator described above.

The present invention enables providing a separator having a configuration capable of achieving both heat insulation performance and formability, and a power source device including the separator.

DESCRIPTION OF EMBODIMENT

First, circumstances leading to an idea of a configuration of a power source device according to an aspect of the present invention will be described. As described in PTL 1, a typical power source device is disposed in the same attitude as a plurality of battery cells. Between adjacent battery cells, an insulative separator is disposed to prevent a short circuit between the adjacent battery cells. Meanwhile, in recent years, as battery cells increase in capacity, the amount of energy held by each of the battery cells tends to increase.

As described above, the power source device of PTL 1 includes the battery cells that are disposed close to each other. Thus, when a certain battery cell is self-heated due to some abnormality, heat is transferred from the certain battery cell to the corresponding adjacent battery cells. When a large amount of heat is transferred from the battery cell in an abnormal state to the corresponding adjacent battery cells, the heat transferred may promote chemical reaction of a power generating element in the corresponding adjacent battery cells. When the battery cells are each increased in capacity, the amount of heat transferred from the battery cell in the abnormal state to the corresponding adjacent battery cells relatively increases, and thus this phenomenon may cause a problem.

For this problem, the inventors of the present invention have studied a configuration in which a separator having heat insulating properties is used. Conventional power source devices each include a separator that uses a resin having high formability to form the separator into a shape capable of achieving various functions such as insulation of adjacent battery cells and prevention of a short circuit due to dew condensation water. Thus, the separator is required to be increased in material thickness to enhance heat insulating properties. Unfortunately, increasing the separator in thickness causes the power source device to be increased in size, and causes a problem in that the power source device decreases in capacity per volume. In contrast, although examples of a member having high heat insulating properties include a heat insulation member in the shape of a sheet, this type of heat insulation member has a problem in that the heat insulation member is difficult to be formed into a shape other than the shape of a sheet due to low formability of the heat insulation member. In view of such circumstances, the present inventors have studied a configuration for enabling use of a heat insulation member in the shape of a sheet.

(Power Source Device)

Figure 1:
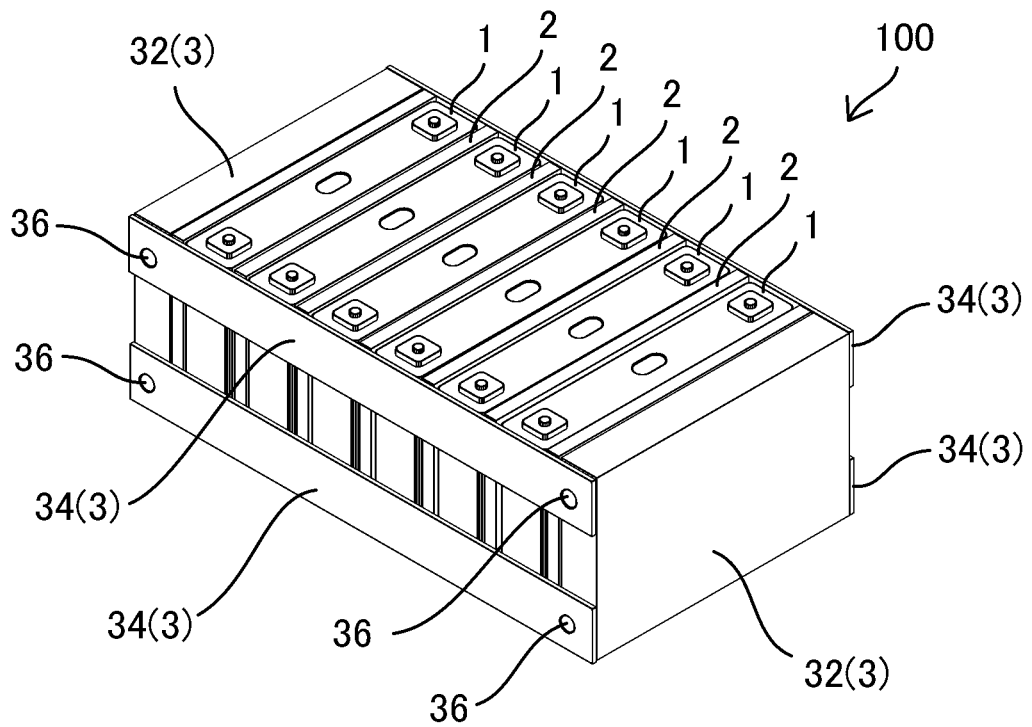
FIG. 1 is a perspective view of a power source device according to an aspect of the present invention.

FIG. 1 is a perspective view illustrating power source device 100 according to an aspect of the present invention. As illustrated in FIG. 1, power source device 100 includes a plurality of battery cells 1, a plurality of separators 2, and restraining member 3 that collects the plurality of battery cells 1 and the plurality of separators 2. The plurality of battery cells 1 is disposed in one direction. Separators 2 are disposed between corresponding adjacent battery cells 1, and hold corresponding adjacent battery cells 1. The plurality of separators 2 has insulating properties and prevents a short circuit between corresponding adjacent battery cells 1. Separators 2 each include a heat insulation sheet and suppress heat transfer between corresponding adjacent battery cells. The plurality of battery cells 1 is connected in series or in parallel using bus bars (not illustrated). Power source device 100 is configured such that voltage and capacity of the power source device are determined in accordance with the number of battery cells 1 connected in parallel and the number of battery cells 1 connected in series. As battery cell 1, various secondary batteries such as a lithium ion secondary battery and a nickel hydrogen battery are available.

Separators 2 each include a heat insulation sheet having a thickness of 0.1 mm to 1.5 mm, and containing a fiber material made of a woven fabric, a nonwoven fabric, or the like, and a heat insulation material supported between fibers of the fiber material. The heat insulation sheet suitable for an exemplary embodiment of the present invention has a thermal conductivity of 0.02 W/(m·K) or less. The heat insulation material is preferably a porous material having a void structure such as xerogel or aerogel. In particular, silica aerogel and silica xerogel have a nano-sized void structure that restricts movement of air molecules, and have excellent heat insulation performance. The silica xerogel can stably maintain its structure against external pressing. Silica particles have a high melting point, so that the silica xerogel also has high heat resistance. As the fibers constituting the fiber sheet, various fibers are available, and fire-retardant fibers having heat resistance may be contained. As the fire-retardant fibers, acrylic oxide fibers, fire-retardant vinylon fibers, polyetherimide fibers, aramid fibers, glass fibers, and the like are known. In particular, when the fiber sheet contains glass fibers, improvement of rigidity and reduction of creep deformation can be expected in addition to improvement of heat resistance. The heat insulation sheet using the fiber sheet containing fire-retardant fibers is not damaged even when battery cells 1 are heated to a high temperature due to thermal runaway, and can stably block conduction of thermal energy to effectively prevent induction of thermal runaway.

The fibers contained in the heat insulation sheet are each preferably a synthetic fiber having a small fiber diameter. The heat insulating properties of the heat insulation sheet is caused by characteristics of powder described later, and when a synthetic fiber having a small fiber diameter is used as a base material, a large amount of powder can be contained in the heat insulation material. Each fiber used in the present exemplary embodiment preferably has a fiber diameter of 1 μm to 30 μm from the viewpoint of achieving both thermal conductivity and productivity.

The heat insulation sheet may be formed by adding a thermoplastic resin. The heat insulation sheet with the thermoplastic resin added can be improved in rigidity. Various properties can be imparted to the heat insulation sheet by coating a surface thereof. For example, when the surface is covered with a coating layer made of alumina having a low radiation factor, influence of radiation heat transfer of the heat insulation member can be suppressed. When the heat insulation sheet is formed in this manner, physical characteristics can be appropriately imparted to the heat insulation sheet by adjusting additives in accordance with required performance while heat insulating properties, heat resistance, and the like are maintained.

As illustrated in FIG. 1, restraining member 3 includes a pair of end plates 32 disposed at both respective ends in a stacking direction of the plurality of battery cells 1 stacked, and a plurality of binding bars 34 fixed to the pair of end plates 32. End plate 32 is connected to an end of binding bar 34. Binding bar 34 is fixed to end plate 32 with set screw 36.

Binding bar 34 is manufactured by processing a metal plate having a predetermined thickness into the metal plate with a predetermined width. Binding bars 34 are connected at their ends to corresponding end plates 32 to connect the pair of end plates 32 and hold battery cells 1 between end plates 32. Binding bars 34 fix the pair of end plates 32 at a predetermined dimension to prevent expansion of battery cells 1 stacked between end plates 32. When binding bars 34 extend, the expansion of battery cells 1 cannot be prevented. Thus, binding bar 34 is manufactured by processing a metal plate having strength that prevents the metal plate from extending due to expansion pressure of battery cells 1, such as a stainless-steel plate of SUS 304 or the like, or a steel plate, into the metal plate with a width and a thickness having sufficient strength.

Although binding bar 34 in FIG. 1 is fixed to end plate 32 with set screw 36, binding bar 34 is not necessarily fixed with a screw member. Specifically, binding bar 34 can be fixed by using welding, a locking structure, or the like. Although power source device 100 of FIG. 1 includes binding bar 34 that is fixed to a side surface of end plate 32, fixing structure between the end plate and the bind bar is not limited to the structure illustrated. Binding bar 34 requires a function of regulating a relative distance between the pair of end plates 32. End plate 32 and binding bar 34 may have any structure as long as displacement of the pair of end plates can be restricted.

(Battery Cell)

Figure 2:
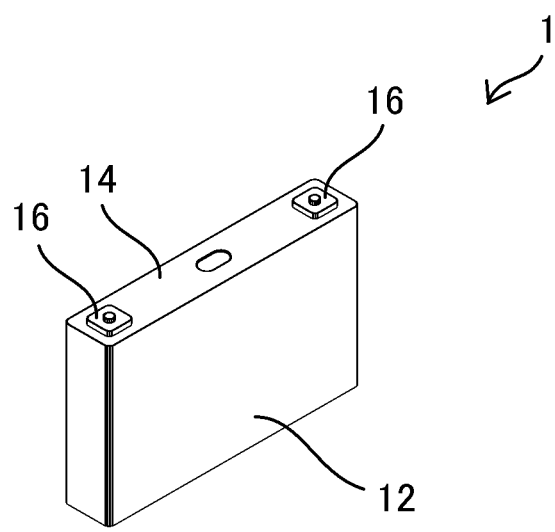
FIG. 2 is a perspective view of a battery cell in FIG. 1.

As illustrated in FIG. 2, battery cell 1 includes exterior can 12 having a rectangular parallelepiped shape, and sealing body 14 provided with positive and negative electrode terminals 16. Battery cell 1 also includes an electrode body housed in exterior can 12, and exterior can 12 is filled with an electrolytic solution, and has characteristics of expanding or contracting with charge and discharge, or deterioration.

Exterior can 12 is formed in a box shape having an opening. Sealing body 14 is welded to exterior can 12 to close an opening of exterior can 12. Specifically, exterior can 12 is manufactured by deep-drawing a metal plate made of aluminum, an aluminum alloy, or the like. Sealing body 14 is formed of a metal plate made of aluminum or an aluminum alloy, for example, as with exterior can 12. Positive and negative electrode terminals 16 are fixed to both respective ends of sealing body 14. Sealing body 14 is welded while being inserted into the opening of exterior can 12. Typically, sealing body 14 is airtightly fixed to exterior can 12 by irradiating a boundary between an outer periphery of sealing body 14 and an inner periphery of exterior can 12 with a laser beam.

The battery cell with the exterior can and the sealing body that are made of metal has a surface with the metal exposed. This type of battery cell may include an exterior can having a surface covered with an insulating heat-shrinkable tube to prevent a short circuit due to dew condensation water or the like. Even the present exemplary embodiment may use the structure in which exterior can 12 has a surface covered with a heat-shrinkable tube as necessary.

(Separator 2A)

Figure 3:
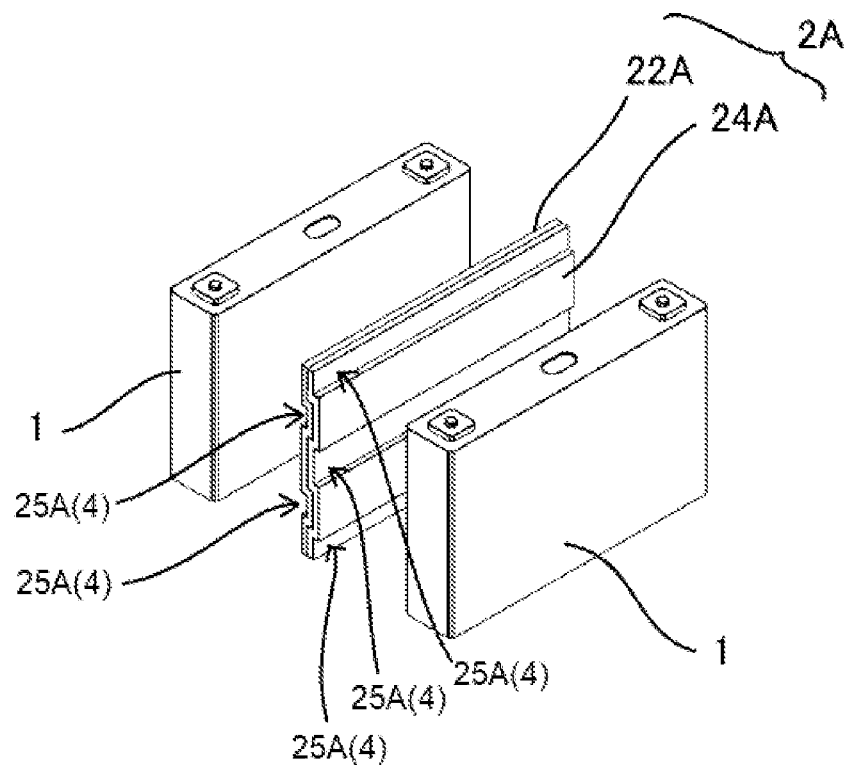
FIG. 3 is a perspective view illustrating an example of a separator in FIG. 1.

FIG. 3 is a perspective view illustrating an example of separator 2 illustrated in FIG. 1. As illustrated in FIG. 3, separator 2A includes heat insulation sheet 24A and formed member 22A. Heat insulation sheet 24A is layered on formed member 22A, and formed member 22A maintains the shape of separator 2A. Formed member 22A is preferably a metal plate. Formed member 22A has a shape having a rectangular pattern in section, and heat insulation sheet 24A is disposed along a surface of formed member 22A. As a result, separator 2A has a shape in which a plurality of grooves 25A extending in one direction is formed on each of its surfaces with a rectangular pattern shape in section. When separator 2A is interposed between adjacent battery cells 1, cooling gap 4 for cooling the battery cells can be formed between each of adjacent battery cells 1 and separator 2A.

Separator 2A configured as described above is formed by, for example, pressing a laminate of a metal plate being formed member 22A and heat insulation sheet 24A. Separator 2A may be formed by attaching heat insulation sheet 24A to formed member 22A previously formed into the above shape. Separator 2A having this structure includes an adhesive layer interposed between heat insulation sheet 24A and formed member 22A. Although not illustrated, separator 2A may be formed by layering a plurality of layers of heat insulation sheet 24A and formed member 22A.

According to this structure, separator 2 is formed of the heat insulation sheet having high heat insulating properties and the formed member having high formability, and the shape of separator 2 can be maintained using the formed member in which the heat insulation sheet having high flexibility is formed into a predetermined shape.

(Separator 2B)

Figure 4:
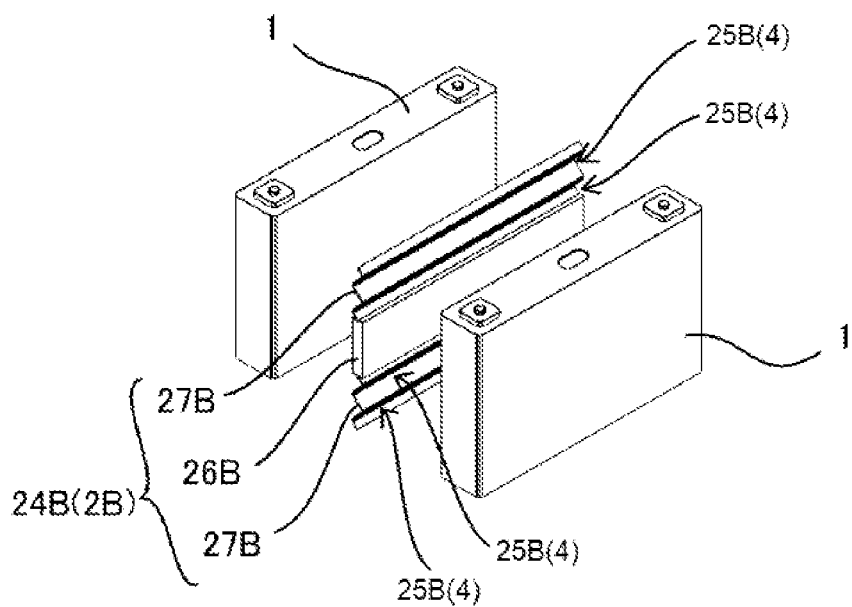
FIG. 4 is a perspective view illustrating an example of a separator in FIG. 1.
Figure 5:
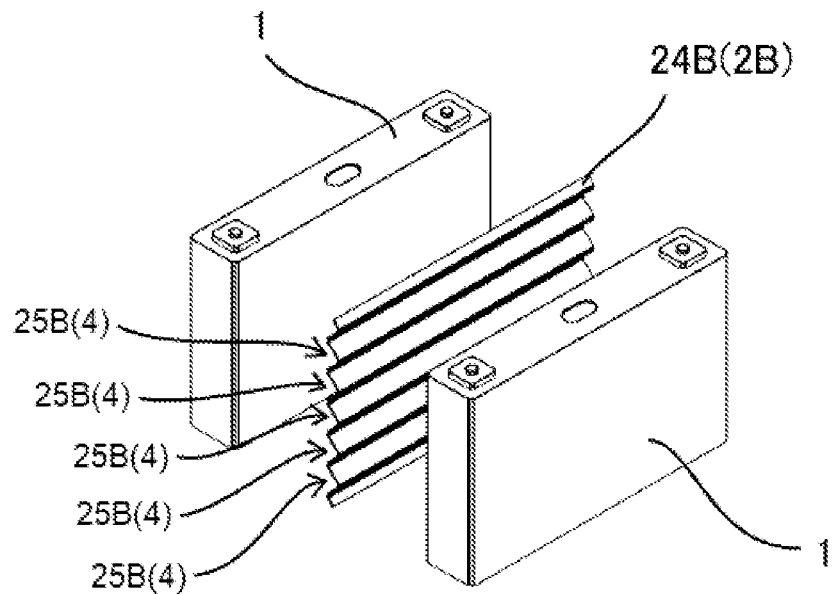
FIG. 5 is a perspective view illustrating a modification of the separator in FIG. 4.

FIGS. 4 and 5 are each a perspective view illustrating an example of separator 2 illustrated in FIG. 1. Separator 2B illustrated in FIGS. 4 and 5 is heat insulation sheet 24B containing a thermoplastic resin among the heat insulation sheets described above. Separator 2B of FIG. 4 is configured such that at least a part of heat insulation sheet 24B is compressed and deformed, and a plurality of grooves 25B extending in one direction is formed on both respective surfaces of separator 2B. Specifically, separator 2B in FIG. 4 is formed with base 26B in contact with adjacent battery cells 1, and thin wall portion 27B thinner than base 26B. Base 26B is formed in a planar shape having an outer shape extending in a plane parallel to surfaces of adjacent respective battery cells 1, the surfaces facing each other. Thin wall portion 27B has a shape in which at least one cooling gap 4 extending in the one direction is formed between adjacent battery cells 1. Separator 2B of FIG. 5 is configured such that the entire surface of heat insulation sheet 24B is compressed and deformed, and a plurality of grooves 25B extending in one direction is formed on both respective surfaces of separator 2B. Specifically, separator 2B is formed into a predetermined shape by compressing heat insulation sheet 24B into a predetermined shape in a heated state and then curing the thermoplastic resin by cooling. Heat insulation sheet 24B containing a thermoplastic resin does not have ductility as high as that of a metal plate, and thus when compression deformation with a large degree of deformation is performed, the sheet may be broken or a thermosetting resin may be cracked. Thus, the separator 2B preferably has a shape deformed into a wave shape as illustrated in FIGS. 4 and 5.

According to this structure, the thermoplastic resin is added when the heat insulation sheet is manufactured, so that the heat insulation sheet is improved in formability, and thus the heat insulation sheet 24B can be formed into a predetermined shape.

(Separator 2C)

Figure 6:
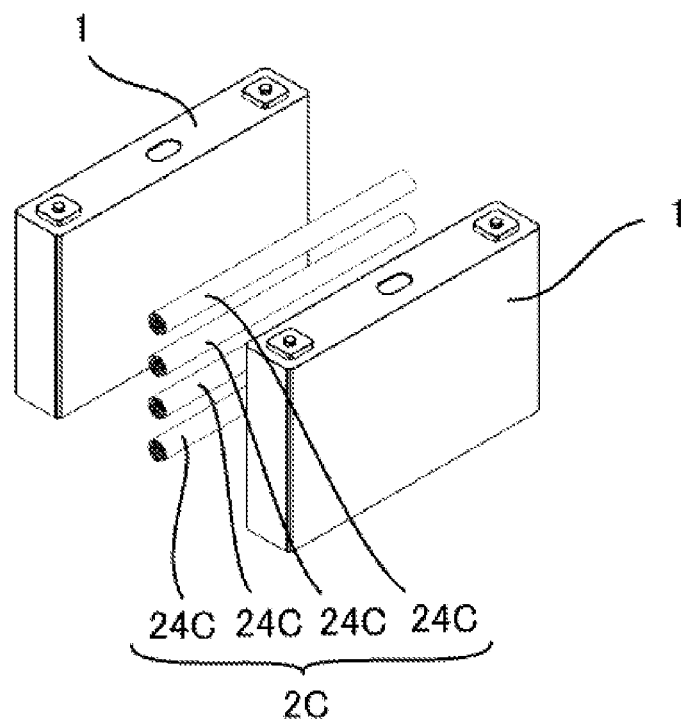
FIG. 6 is a perspective view illustrating an example of a separator in FIG. 1.
Figure 7:
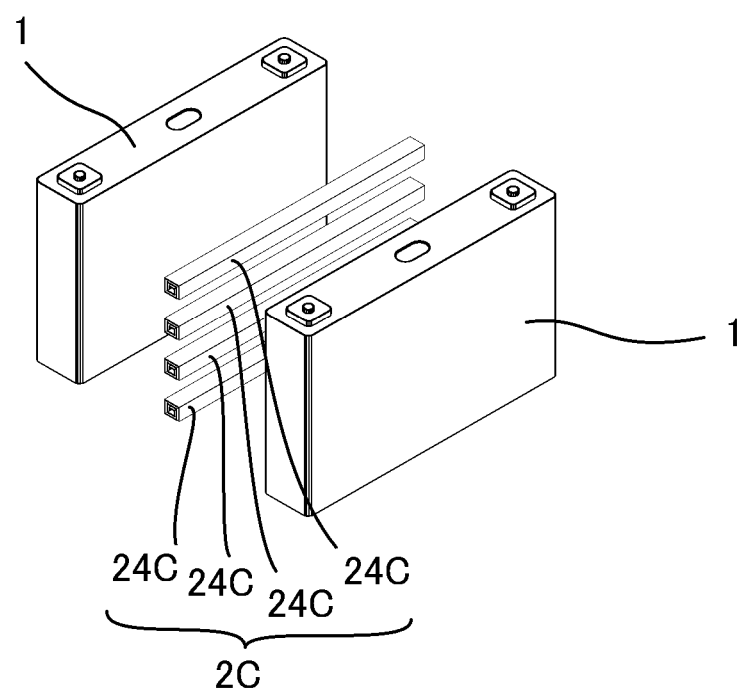
FIG. 7 is a perspective view illustrating a modification of the separator in FIG. 6.

FIGS. 6 and 7 are each a perspective view illustrating an example of separator 2 illustrated in FIG. 1. As illustrated in FIG. 6, separator 2C includes a plurality of heat insulation sheets 24C having a rod-like shape. Each of heat insulation sheets 24C is wound and has a rod-like shape in which a cavity is formed about a center axis of the rod-like shape. Additionally, a gap is formed between the corresponding plurality of heat insulation sheets disposed between adjacent battery cells, and the gap can serve as a cooling gap for cooling the battery cells. The cavity formed about the central axis of the heat insulation sheet 24C in the rod-like shape also serves as a cooling gap for cooling the battery cell. Heat insulation sheet 24C constituting separator 2C in FIG. 6 is formed into a spiral shape having a quadrangular outer shape in sectional view. Heat insulation sheet 24C constituting separator 2C in FIG. 7 is formed into a spiral shape having a circular outer shape in sectional view. Separator 2C having the above structure can be formed by, for example, winding heat insulation sheet 24C around a core material of a quadrangular column or a circular column, fixing an end of the winding with a tape or an adhesive, and then removing the core material.

According to this structure, separator 2 can have heat insulating properties and include a flow path for cooling the battery cell while having a shape that can be formed with a sheet.

The present invention has been described above based on the exemplary embodiment. The exemplary embodiment is exemplified, and it is understood by those skilled in the art that various modifications are available for combinations of each component of the exemplary embodiment and each processing process thereof, and that such modifications are also within the scope of the present invention.

REFERENCE MARKS IN THE DRAWINGS 100 power source device
1 battery cell
12 exterior can
14 sealing body
16 electrode terminal
2, 2A, 2B, 2C separator
22A formed member
24A, 24B, 24C heat insulation sheet
25A, 25B groove
26B base
27B thin wall portion
3 restraining member
32 end plate
34 binding bar
36 set screw

The invention claimed is:

1. A separator that insulates adjacent battery cells, the separator comprising:
    a heat insulation sheet including a fiber material and a heat insulation material including higher heat insulating properties than heat insulating properties of the fiber material; and
    a formed member including a higher shape stability than a shape stability of the heat insulation sheet,
    wherein the separator includes a shape including at least one gap extending in one direction between the separator and each of the adjacent battery cells,
    wherein said shape is formed of a combination of the heat insulation sheet and the formed member superimposed on each other while overlapping the each of the adjacent battery cells, and
    wherein an entirety of the separator is sandwiched between the adjacent battery cells in a stacking direction of the adjacent battery cells.

2. The separator according to claim 1, wherein the formed member is a metal plate.

3. The separator according to claim 2, further comprising: an adhesive layer interposed between the formed member and the heat insulation sheet.

4. The separator according to claim 1, wherein a surface of the heat insulation sheet is covered with a coating layer made of alumina.

5. The separator according to claim 1, wherein the fiber material includes at least one selected from the group consisting of acrylic oxide fibers, fire-retardant vinylon fibers, polyetherimide fibers, and aramid fibers.

6. The separator according to claim 1, wherein the separator is a bilayer sheet essentially consisting of a single layer of the heat insulation sheet and a single layer of the formed member.

7. A separator that insulates adjacent battery cells, the separator comprising:
    a heat insulation sheet including a fiber material, a heat insulation material including higher heat insulating properties than heat insulating properties the fiber material, and a thermoplastic resin including a property of being cured by application of heat,
    wherein the separator includes a shape including at least one gap extending in one direction between the separator and each of the adjacent battery cells,
    a formed member including a higher shape stability than a shape stability of the heat insulation sheet,
    wherein said shape is formed of a combination of the heat insulation sheet and the formed member superimposed on each other while overlapping the each of the adjacent battery cells,
    wherein said shape is formed of the heat insulation sheet overlapping the each of the adjacent battery cells,
    the heat insulation sheet includes:
        a base formed in a planar shape including an outer shape extending in a plane parallel to surfaces of adjacent respective battery cells, the surfaces facing each other, the base configured to be in contact with the adjacent battery cells, and
        a thin wall portion thinner than the base,
    the thin wall portion includes the shape including the at least one gap, wherein said shape extends in the one direction between the thin wall portion and each of the adjacent battery cells.

8. The separator according to claim 7, wherein a surface of the heat insulation sheet is covered with a coating layer made of alumina.

9. The separator according to claim 7, wherein the fiber material includes at least one selected from the group consisting of acrylic oxide fibers, fire-retardant vinylon fibers, polyetherimide fibers, and aramid fibers.

10. The separator according to claim 7, wherein the separator is a monolayer sheet essentially consisting of a single layer of the heat insulation sheet.

11. A power source device comprising:
    a plurality of battery cells each including a quadrangular outer shape;
    a plurality of separators each disposed between a corresponding pair of adjacent battery cells among the plurality of battery cells, each of the plurality of separators being the separator according to claim 1; and
    a restraining member that collects the plurality of battery cells and the plurality of separators.

* * * * *